April 22, 1969     D. M. WILLYOUNG     3,440,462

DYNAMOELECTRIC MACHINE GAP PICK ROTOR WEDGES

Filed March 3, 1966

INVENTOR:
DAVID M. WILLYOUNG,

BY *W. C. Crutcher*

HIS ATTORNEY.

3,440,462
DYNAMOELECTRIC MACHINE GAP PICK ROTOR WEDGES
David M. Willyoung, Scotia, N.Y., assignor to General Electric Company, a corporation of New York
Filed Mar. 3, 1966, Ser. No. 531,587
Int. Cl. H02k 1/32, 9/00
U.S. Cl. 310—61                                               7 Claims

ABSTRACT OF THE DISCLOSURE

Rotor wedges for gas cooled dynamoelectric machine having recessed arcuate passages and a flow separator milled into their end faces, so that two wedges together provide a gas pick-up inlet.

---

This invention relates to dynamoelectric machines and more particularly to improvements in the rotor structure thereof permitting more effective machine cooling.

In order to increase the capacity of a given size of dynamoelectric machine such as a generator, it is necessary to cool the conductors or windings. In the case of the rotor field windings, this is generally done on larger machines by the conductor-cooled method in which coolant gas such as hydrogen is passed directly in contact with the bare copper of the conductors. One means by which this hydrogen is circulated along and within these hollow conductors is by use of the "gap pickup" principle. A "gap pickup" generator is one in which the rotor, enclosed in an atmosphere of coolant gas, has passages extending more or less radially from its surface to its conductor passages. These holes are of such configuration as to act like scoops or a gas pump when rotating such that the coolant gas is motivated therethrough and into the cooling passages of the conductors themselves. The gas is then exhausted from the conductor passages through outlet passages at a point axially displaced along the rotor. The outlet passages extend to the rotor surface in a more or less radial direction. Very effective cooling is achieved when the flow passages through the conductors are arranged in a diagonal flow geometry as described in my U.S. Patent 2,986,664 issued on May 30, 1961.

The holes on the surface of the rotor which take in and exhaust the coolant gas are usually formed in the rotor wedges which are the members axially dovetailed between adjacent teeth to hold the conductor bars in place during rotation (see the aforementioned Patent 2,986,664). These holes are generally of circular cross section and are formed by drilling and hand finishing. In order to achieve the best possible flow rate in such a gap pickup rotor, the inlet holes must be curved from a relatively tangential direction at the rotor surface to a steeper, more radial direction as they go deeper into the wedges. In other words, axes of the wedge inlet holes should be curved. This has been approximately accomplished in prior art construction by intersecting holes from opposite sides of the workpiece (wedge) at different angles, and then hand finishing the area of juncture of the two holes thus drilled. This is a time-consuming, expensive, and relatively imprecise method. In addition, it restricts the geometry of the inlet hole to a more or less circular cross section and the shape of the flow passage centerline to one formed of a series of segments rather than one tailored to optimum coolant flow.

In designing gap pickup holes, it is desirable to provide a maximum coolant flow which in turn requires a maximum inlet hole cross sectional area or a maximum number of gap pickups. At the same time, the wedges must be designed with enough integrity so as to avoid high shear and bending stresses which appear in planes parallel to the rotor axis when the rotor is running. Thus, from this standpoint, it is desirable to have as small a fraction of the axial length of the wedge as possible cut through by gas flow passages which weaken the wedges. Therefore, an optimum arrangement of gap pickup flow area and wedge strength exists somewhere between these two extremes.

It is well known in fluid flow devices that when the centerline of a fluid passage is curved, there is a strong tendency for the flow to crowd to the outer, larger radius wall and separate from the inner smaller radius wall in an unstable or eddying flow which increases the presssure drop through the curved passage and reduces the flow. This tendency to separate is increased if there are discontinuities or sharp changes in the direction of the passage. In the prior art gap pickup inlet passage, the flow crowds to the outer or trailing wall and separates from the inner or leading wall surface, resulting in a non-uniform velocity profile discharging in a radially inward direction from the inlet holes to the further flow passages through the conductors. The flow of coolant leaving the rotor inlet wedge is normally split into two separate diagonal-flow circuits through the conductors as shown in FIG. 4 of the aforementioned U.S. Patent 2,986,664. The non-uniform velocity profile discharging from the inert wedge into the flow-splitter of a diagonal flow rotor results in more flow through the downstream diagonal passage than the upper passage, and while this does not produce serious local imbalances in the temperature rise along the conductors because of the excellent heat conduction and heat transfer coupling between flow circuits, it does result in lower total flow per inlet hole and higher average temperature rise than would otherwise be the case. It is well known that flow separation in a curved passage can be avoided by careful control of the geometry of the passage centerline and of its cross-sectional area. In sharply curving passages, this often requires flow stabilizing vanes (called Frey vanes) in the bend.

Accordingly, it is an object of the present invention to provide a dynamoelectric machine gap pickup rotor with gaps therein machined with improved precision and greater economy.

Another object is to provide a gap pickup dynamoelectric machine having a greater coolant flow cross section without sacrificing wedge bending strength.

Another object is to provide a gap pickup-inlet passage with a guide vane therein for flow equalization.

Other objects, advantages, and features will become apparent from the following detailed description taken in connection with the accompanying drawing.

Briefly stated, in accordance with one of its aspects, the present invention is practiced by rotor wedges cut into short lengths equal to the pitch of the gap pickup holes. The passages or holes are then formed by milling them in the end faces of the wedge pieces. The resulting passages are rectangular in cross section providing more flow area for a given axial dimension of the passage.

Figure 1:
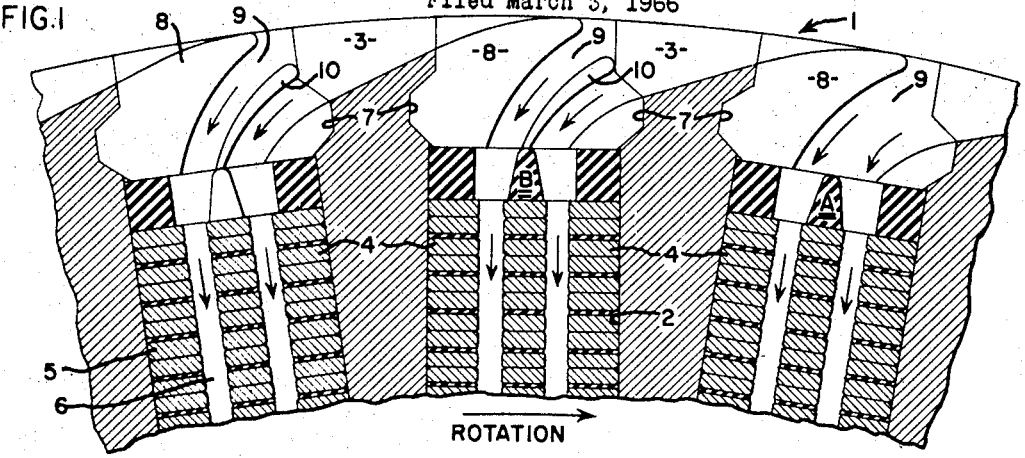
FIG. 1 is an axial cross section, taken along line I—I of FIG. 2, of a part of a generator rotor according to the present invention.

Referring now to FIG. 1, a dynamoelectric machine rotor is generally indicated at 1. In the rotor body 1 are axially extending slots 2 defined by axially extending teeth 3. Within slots 2 are rotor field conductor bars 4, which comprise a plurality of longitudinal conductors 3 wound therein. Conductors 5 are pierced, or otherwise define passages 6 for the passage therethrough of a coolant fluid such as hydrogen gas. The gas flow within conductor bars 4 and indicated by the arrows in FIG. 1 in reality is flowing in a diagonal direction. That is to say, it is flowing radially inward while at the same time flowing in an axial direction. When it reaches its radially innermost point, the passages 6 carry it, again along a diagonal path, back to the rotor surface to exhaust into the generator casing.

Keyways 7 are formed along the crown portions of teeth 3. Wedges 8 are keyed or fit within keyways 7 and between teeth 3 so as to hold conductor bars 4 firmly in place during rotation of the rotor 1. Wedges 8 have passages or channels 9 formed therein which lead from the rotor exterior or air gap to passages 6 in the conductors.

In the prior art, as shown in the aforementioned U.S. Patent 2,986,664, wedges exist in length such that a plurality of inlet passages are formed therein. These inlet holes therefore are usually drilled, providing a circular cross section, and if the axes of the holes are to be curved for proper flow configuration, the holes must be drilled from both sides and hand-mated at their junctures to achieve some degree of smooth transition therein.

Figure 2:
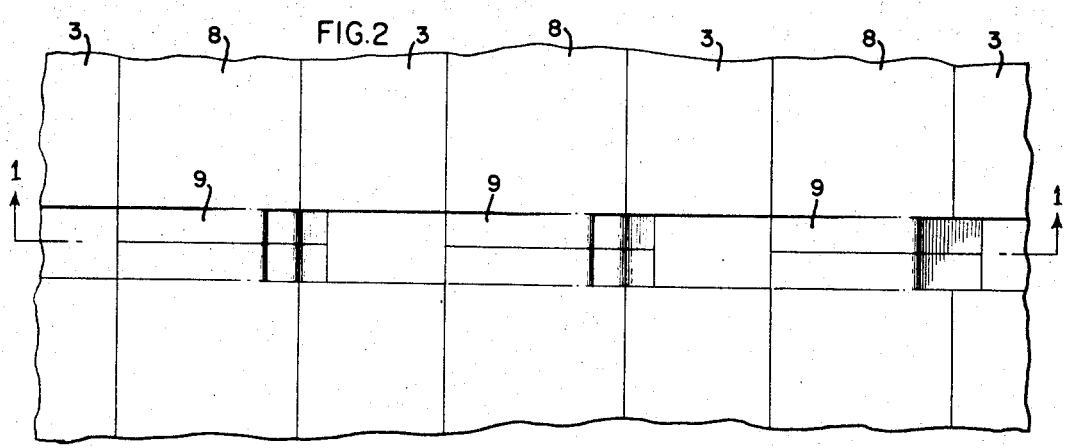
FIG. 2 is a developed plan view of FIG. 1.
Figure 4:
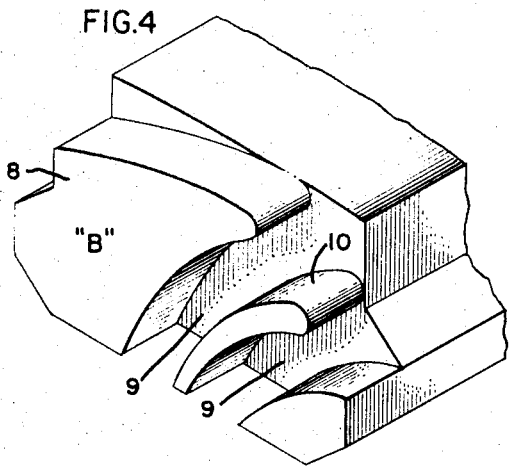
FIG. 4 is a perspective view of a rotor gap pickup wedge according to an alternate embodiment of the present invention.
Figure 3:
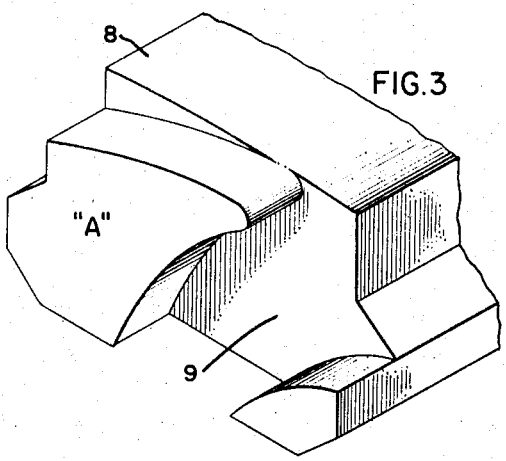
FIG. 3 is a perspective view of a rotor gap pickup wedge according to the present invention.

According to the present invention and as shown in FIG. 2, wedges 8 are made up of segments which join at the center lines of passages 9. Thus all the surfaces within passages 9 are accessible for purposes of machining. The view of wedges 8 in FIG. 1 is an actual end view of a wedge piece 8, only the remainder of the view being a cross-section. The passages 9 are milled in the end faces of wedges 8. This enables the passage to be of any desired configuration and eliminates the handwork formerly done within the round holes of the prior art.

For a given axial dimension of passages 9 (that is to say, for a given amount of weakening of the wedge bending strength), a square hole will have a cross section greater than a round hole by the factor of $4/\pi$ or about 27% greater. However, due to the method of machining passages 9 from the end by milling, the passages can be made rectangular so that the lateral dimension is greater than the longitudinal or axial dimension. This will provide an even greater cross section of passages 9 with a given axial dimension. In application, it has been found that the flow area through the wedge can be increased by 50 to 60% in this way without weakening the wedge.

FIG. 1 shows two embodiments of the present invention. The one above described is labeled "A." In embodiment "B" a guide vane 10 or a plurality of such guide vanes is provided by machining a passage 9 on either side of the guide vane for the purpose of guiding and stabilizing coolant flow, causing it to fill the passage more completely and uniformly. Aerodynamically, this serves to reduce losses incurred with turning the fluid through an arc. Also, where two or more passages are to be supplied, a better and controlled distribution of coolant is possible.

While the drawing and foregoing description have been directed toward an inlet gap, the invention also contemplates a similar treatment for the outlet gaps in order to increase their flow area a corresponding amount, although their flow passage configuration is somewhat different, being less curved and more radial. This will not be described in detail because the same general description would apply. It is sufficient to say that the outlet gaps, being machined in a similar manner in the wedges of the outle portions of the rotor, define rectangular outlet flow passages of increased flow area, without weakening the wedge by reducing the axial length available for supporting the principal load.

It will be apparent that a wedge for a gap-pickup rotor has been described herein which allows a greater coolant flow therethrough due to a greater gap or passage cross-section.

It will further be appreciated that the greater gap cross-section can be achieved (for a single passage such as embodiment A) with no increase (and even a decrease) in the longitudinal dimension of the gap. Thus the wedge bending strength and coolant flow may be increased, together or in the alternative, depending on design requirements.

It will further be appreciated that more gently curving passages can be obtained without abrupt changes in flow, such as are conducive to flow separation, and that the passage centerline contour may be adjusted for optimum fluid flow performance. Furthermore, more precise machining of the wedge passages is possible in the present invention which eliminates variable manual finishing operations. Guide vanes can be employed as in embodiment B. The wedge pieces of this invention can therefore be more readily quantity-produced.

It will further be appreciated that the wedges of this invention are made in such a way as to permit guide vanes to be machined therein, should they be desired. A gap pickup rotor employing wedges formed according to this invention will have increased gas flow therethrough and hence increased capability because of the increased gas flow area in the inlet and discharge passages, and because of the improved, better controlled fluid flow behavior within the passage areas.

It will occur to others of ordinary skill in the art to make modifications of the present invention which will remain within the concept and scope thereof and will not constitute patentable departure therefrom. For example, the complete passage could be machined in one end of a wedge rather than one-half of a passage in each end of a wedge. It is intended, therefore, that the invention be not limited by the details in which it has been described but that it encompass all within the purview of the following claims.

What is claimed is:

1. A dynamoelectric machine gap pickup rotor comprising a plurality of axially extending teeth defining slots therebetween, and a plurality of wedges in each of said slots keyed to said teeth at their crown portions, the abutting faces of adjacent wedges being recessed to define an arcuate passage therebetween, said passage opening at the rotor surface and at the rotor interior, the axis of said passage lying in a plane substantially parallel to the plane of said adjoining faces.

2. A dynamoelectric machine gap pickup rotor according to claim 1, in which said arcuate passage is substantially rectangular in cross section.

3. A dynamoelectric machine gap pickup rotor according to claim 1, in which at least two passages cooperate to provide a curved guide vane therebetween.

4. A conductor-cooled dynamoelectric machine rotor comprising a plurality of axially extending teeth defining slots therebetween, a conductor bar comprising a plurality of conductors and longitudinally disposed in each of said slots, said conductors defining passages therebetween within said bars, a plurality of wedges in each of said slots keyed to said teeth at their crown portions, the abutting faces of adjacent wedges being recessed to define an arcuate passage therebetween, said arcuate passage communicating with said first-named passages and with the rotor exterior at its surface, the axis of said passage lying in a plane substantially parallel to the plane of said adjoining faces.

5. A conductor-cooled dynamoelectric machine rotor according to claim 4, in which said arcuate passage is substantially rectangular in cross section.

6. A conductor-cooled dynamoelectric machine rotor according to claim 4, in which at least two arcuate pasages cooperate to provide a curved guide vane therebetween.

7. A dynamoelectric machine rotor according to claim 4 wherein said wedge has a key on each side and defines an arcuate slot in at least one end thereof, the axis of said slot lying in a plane substantially perpendicular to the axes of said keys.

References Cited
FOREIGN PATENTS
612,236   4/1935   Germany.

MILTON O. HIRSHFIELD, *Primary Examiner.*

R. SKUDY, *Assistant Examiner.*

U.S. Cl. X.R.

310—58